United States Patent
Yabe et al.

(10) Patent No.: US 10,919,470 B2
(45) Date of Patent: Feb. 16, 2021

(54) VEHICLE FRONT STRUCTURE

(71) Applicant: TOYOTA JIDOSHA KABUSHIKI KAISHA, Toyota (JP)

(72) Inventors: Takuya Yabe, Toyota (JP); Takashi Tagaito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 16/245,278

(22) Filed: Jan. 11, 2019

(65) Prior Publication Data

US 2019/0225170 A1    Jul. 25, 2019

(30) Foreign Application Priority Data

Jan. 22, 2018  (JP) .............................. JP2018-007983

(51) Int. Cl.
*B60R 19/02* (2006.01)
*B60R 19/34* (2006.01)
*B60R 19/24* (2006.01)

(52) U.S. Cl.
CPC ............ *B60R 19/023* (2013.01); *B60R 19/34* (2013.01); *B60R 2019/247* (2013.01)

(58) Field of Classification Search
CPC ....... B60R 19/02; B60R 19/023; B60R 19/24; B60R 19/26; B60R 19/34; B62D 21/152; B62D 21/155

USPC .................................................. 293/152, 155
See application file for complete search history.

(56) References Cited

U.S. PATENT DOCUMENTS

| | | | |
|---|---|---|---|
| 8,403,403 B2* | 3/2013 | Tashiro | B60R 19/02 180/68.4 |
| 9,555,754 B2* | 1/2017 | Hara | B62D 21/152 |
| 9,751,565 B2* | 9/2017 | Tatsuwaki | B62D 21/155 |
| 9,925,937 B2* | 3/2018 | Watanabe | B62D 25/08 |
| 2015/0042124 A1* | 2/2015 | Hyodo | B60R 19/12 296/187.1 |
| 2015/0251613 A1* | 9/2015 | Mori | B60R 19/18 296/187.09 |
| 2016/0039373 A1* | 2/2016 | Yamada | B60R 19/24 293/132 |
| 2017/0113723 A1* | 4/2017 | Murata | B62D 21/11 |
| 2018/0273098 A1* | 9/2018 | Komiya | B62D 21/155 |

FOREIGN PATENT DOCUMENTS

JP          2002-166799          6/2002

* cited by examiner

*Primary Examiner* — Jason S Daniels
(74) *Attorney, Agent, or Firm* — Oblon, McClelland, Maier & Neustadt, L.L.P.

(57) ABSTRACT

A reinforcement component is disposed in an end portion of an Fr bumper R/F as viewed in a vehicle width direction, the end portion including an outer end of the Fr bumper R/F as viewed in the vehicle width direction. Additionally, an extension projects from an outer end of a front end of an Fr suspension member as viewed in the vehicle width direction further outward as viewed in the vehicle width direction.

4 Claims, 12 Drawing Sheets

VEHICLE FRONT STRUCTURE

CROSS REFERENCE TO RELATED APPLICATION

The entire disclosure of Japanese Patent Application No. 2018-7983 filed on Jan. 22, 2018, including the specification, claims, drawings, and abstract, is incorporated herein by reference in its entirety.

TECHNICAL FIELD

The present disclosure relates to a vehicle front structure that includes a shock absorption structure acting when small overlap crashes occur.

BACKGROUND

There have been known techniques for maintaining a sufficient cabin space by absorbing shock at an engine compartment (vehicle front structure) that is located in front of a cabin (passenger compartment), when a crash at the front of a vehicle (hereinafter referred to as "frontal crash" where appropriate) occurs.

For example, a small overlap (SOL) crash is known as a type of frontal crash. In this type of crash, for example, an obstruction (barrier) hits against an area of a vehicle extending from a side end of the vehicle and having a width that is less than about a quarter of the width of the vehicle.

The load of this crash is received by, for example, skeleton components of the vehicle front structure that are disposed toward a side of the vehicle. For example, the load of the small overlap crash is received by a front suspension member (hereinafter referred to as "Fr suspension member" where appropriate) that supports a front wheel suspension mechanism or a front bumper reinforcement (hereinafter referred to as "Fr bumper R/F" where appropriate) that is disposed in front of the front suspension member and that is disposed across the entire width of the vehicle. For example, JP 2002-166799 A discloses crushing and deforming the Fr bumper R/F for absorbing crash loads when small overlap crashes occur.

SUMMARY

Technical Problem

In some cases, shock loads are not sufficiently absorbed by crushing and deforming the Fr bumper R/F, as the vehicle may slip away from the barrier when a small overlap crash occurs. Specifically, as illustrated in FIG. 10, when a small overlap crash occurs, a vehicle 100 moves obliquely forward relative to a barrier 104 along a lateral force F2 that is produced when a driving force F1 acting forward is resolved along a crash surface 102.

As can be understood from the comparison between the upper diagram and the lower diagram in FIG. 10, the smaller the angle θ between a perpendicular surface 106 relative to the traveling direction and the crash surface 102 (approaching a right angle from an obtuse angle), the greater the lateral force F2. The greater the lateral force F2, the less the shock absorption, as the vehicle 100 constitutes a structure that substantially passes by the barrier 104. As a result, the vehicle may be unable to achieve a desired amount of speed reduction.

With this being the situation, as illustrated in, for example, FIG. 11, as an Fr bumper R/F 108 is crushed and deformed, a crushing surface 108A of the Fr bumper R/F 108 becomes inclined toward the back of the vehicle relative to a normal surface 108B that is not crushed or deformed, and the crash surface angle θ relative to the barrier 104 becomes smaller (approaching a right angle). As a result, with insufficient shock absorption, the vehicle 100 may slip away from the barrier 104.

To address this issue, as illustrated in FIG. 12, a reinforcement component 110 may be installed in the Fr bumper R/F 108 to suppress crushing and deformation. However, even with this configuration, as a front surface 108C of the Fr bumper R/F 108 is pushed toward the back of the vehicle, the front surface 108C may become inclined, resulting in a smaller crash surface angle θ (approaching a right angle).

Solution to Problem

To address the above-described situation, the present disclosure is directed toward providing a vehicle front structure that delays a vehicle from slipping away from a barrier when a small overlap crash occurs, so that a greater crash load can be absorbed than in conventional structures.

The present disclosure relates to a vehicle front structure. The vehicle front structure includes an Fr bumper R/F, a reinforcement component, and an extension. The Fr bumper R/F is disposed in front of an Fr suspension member and extends in a vehicle width direction in a manner such that an outer end of the Fr bumper R/F as viewed in the vehicle width direction projects more outward as viewed in the vehicle width direction than an outer end of a front end of the Fr suspension member as viewed in the vehicle width direction. The reinforcement component is disposed in an end portion of the Fr bumper R/F as viewed in the vehicle width direction, the end portion including the outer end of the Fr bumper R/F as viewed in the vehicle width direction. The extension projects from the outer end of the front end of the Fr suspension member as viewed in the vehicle width direction further outward as viewed in the vehicle width direction.

With the above-described structure, as the reinforcement component is disposed in the end portion of the Fr bumper R/F as viewed in the width direction, crushing and deformation are suppressed when a small overlap crash occurs. Further, as the extension projects from the outer end of the front end of the Fr suspension member as viewed in the vehicle width direction further outward as viewed in the vehicle width direction, even if the end portion of the Fr bumper R/F as viewed in the width direction is pushed backward when a small overlap crash occurs, the extension that is disposed behind the end portion of the Fr bumper R/F as viewed in the width direction receives the end portion of the Fr bumper R/F as viewed in the width direction and suppresses it from moving further backward. As a result, the angle of the crash surface of the Fr bumper R/F (against the barrier) is suppressed from changing from an obtuse angle toward a right angle, and the barrier's slipping away from the vehicle is correspondingly delayed. Therefore, greater crash loads can be absorbed when small overlap crashes occur than in conventional structures.

The above-described disclosure may include a lower side member that extends from the front end of the Fr suspension member toward the front of the vehicle and that is connected to the end portion of the Fr bumper R/F as viewed in the vehicle width direction. In this case, an inner end of the reinforcement component as viewed in the vehicle width direction may be disposed either in alignment, in the vehicle width direction, with an inner ridge line of the lower side member as viewed in the vehicle width direction, or more toward the outside as viewed in the vehicle width direction than the ridge line.

With the above-described structure, as the configuration is such that the reinforcement component for the Fr bumper R/F is disposed in front of the lower side member, crash loads applied when small overlap crashes occur are transmitted to the Fr suspension member via the lower side member without crushing or deformation of the Fr bumper R/F (quickly). As the inner end of the reinforcement component as viewed in the vehicle width direction is disposed either in alignment, in the vehicle width direction, with an inner ridge line of the lower side member as viewed in the vehicle width direction, or more toward the outside as viewed in the vehicle width direction, shock can be absorbed by crushing and deforming the Fr bumper R/F when other types of crashes other than small overlap crashes occur.

Advantageous Effects of Invention

The present disclosure delays a vehicle from slipping away from a barrier when a small overlap crash occurs, so that a greater crash load can be absorbed than in conventional structures.

BRIEF DESCRIPTION OF DRAWINGS

The present disclosure will be further described with reference to the accompanying drawings, wherein like reference numerals refer to like parts in the several views, and wherein.

DESCRIPTION OF EMBODIMENTS

Figure 1:
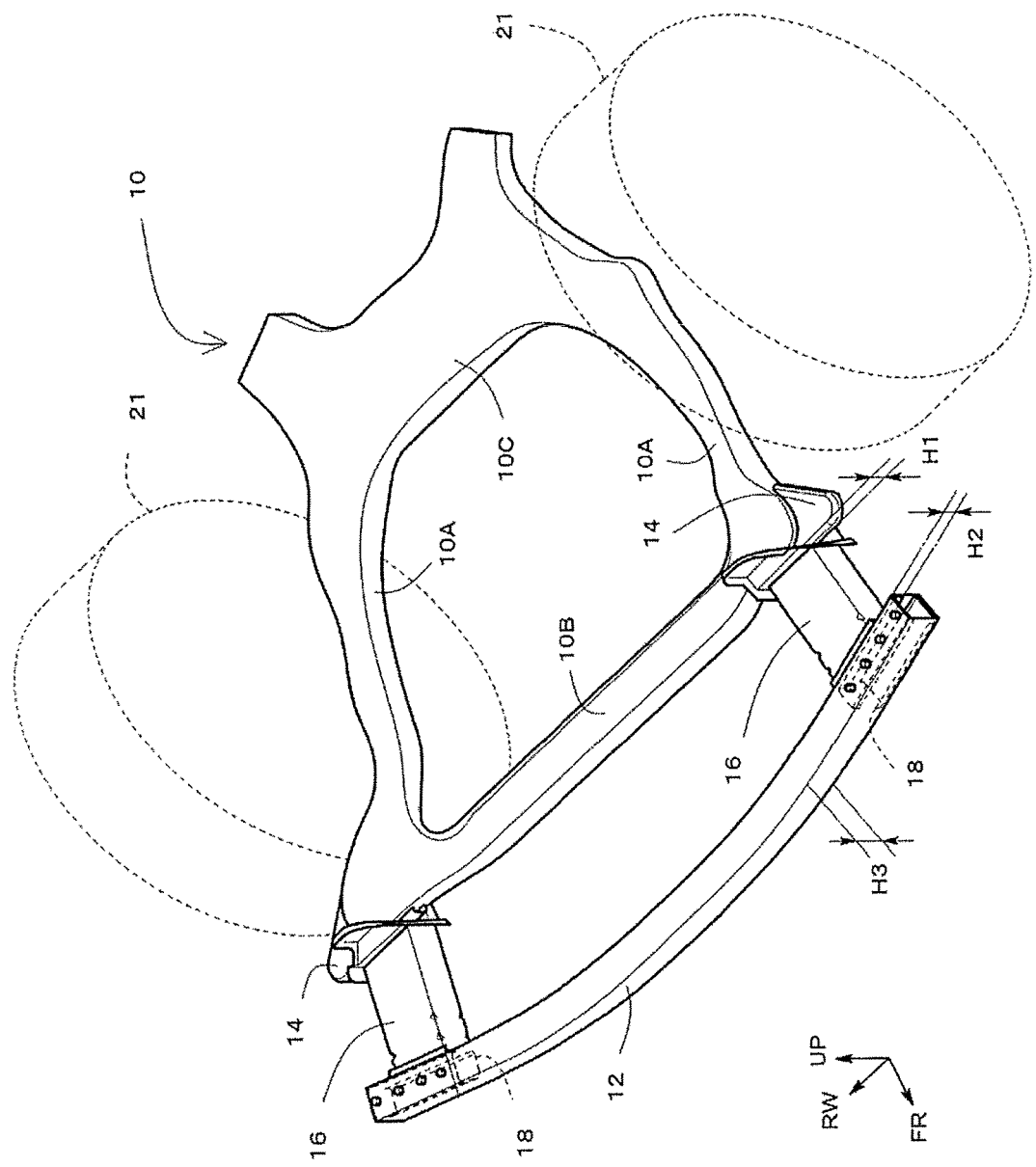
FIG. 1 is a perspective view that illustrates a vehicle front structure according to an embodiment of the present disclosure.
Figure 2:
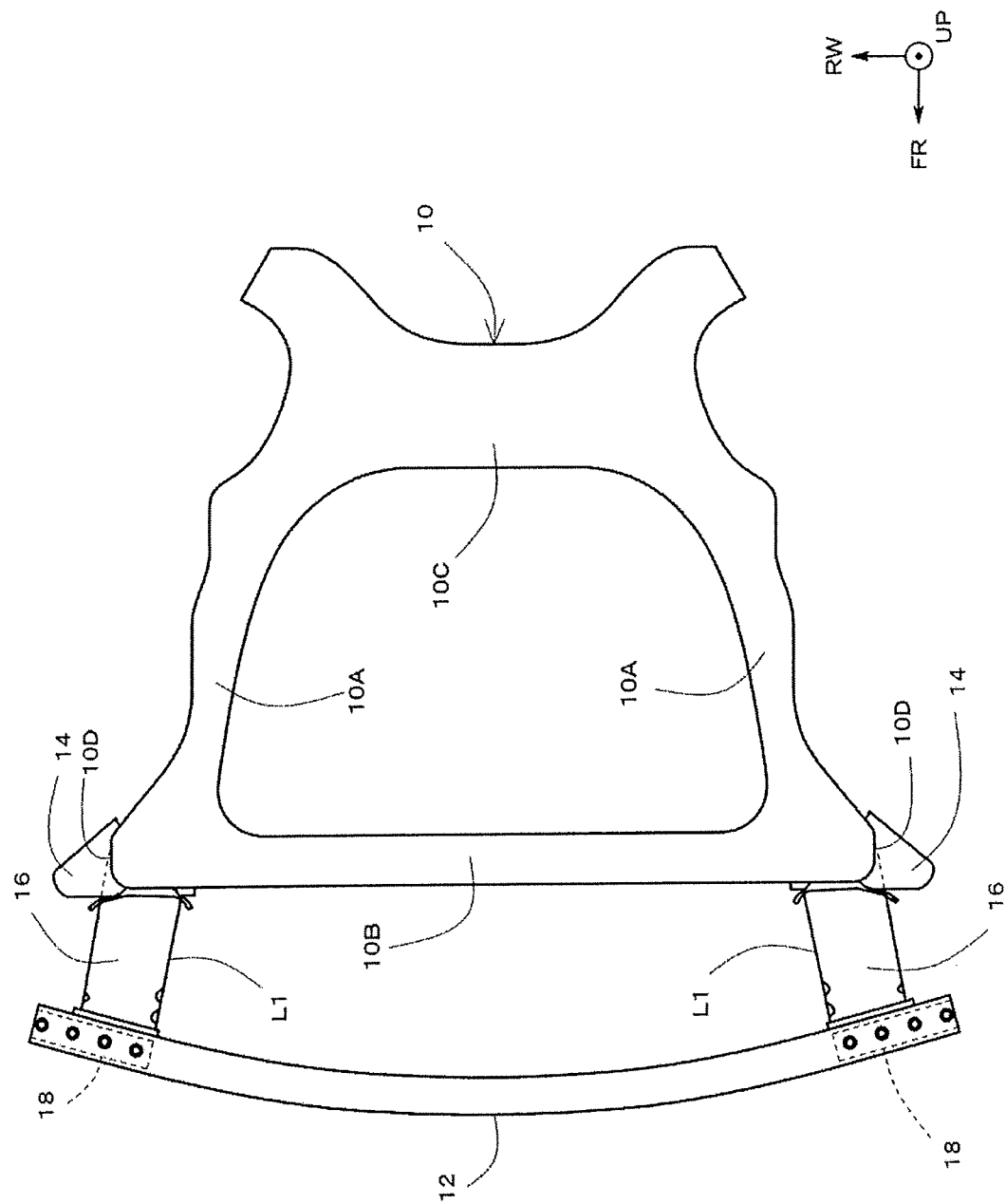
FIG. 2 is a top view that illustrates the vehicle front structure according to the embodiment of the present disclosure.

FIG. 1 illustrates a perspective view of a vehicle front structure according to an embodiment of the present disclosure. FIG. 2 illustrates a top view of this structure.

In FIGS. 1 to 9, the vehicle front-and-rear direction is represented by an axis denoted by symbol FR, the vehicle width direction is represented by an axis denoted by symbol RW, and the vertical direction is represented by an axis denoted by symbol UP. Symbol FR is an abbreviation for front, and the positive direction of the front-and-rear direction axis FR is toward the front of a vehicle. Symbol RW is an abbreviation for right width, and the positive direction of the width direction axis RW is toward the right in the width direction. The positive direction of the height axis UP is upward.

As illustrated in FIG. 1, these axes FR, RW, and UP are orthogonal to each other. In the following description, the vehicle front structure according to the embodiment of the present disclosure will be described with reference to these three axes where appropriate. For example, the term "front end" represents an end of a certain component that is located toward the positive direction of the FR axis, and the term "rear end" represents an end of a certain component that is located toward the negative direction of the FR axis. The term "widthwise inner side" represents a relatively inner side in the width direction of the vehicle along the RW axis, and the term "widthwise outer side" represents a relatively outer side in the width direction of the vehicle along the RW axis. The term "width direction" represents the vehicle width direction unless otherwise specified. The term "upper side" represents a side that is relatively toward the positive direction of the UP axis, and the term "lower side" represents a side that is relatively toward the negative direction of the UP axis.

The vehicle front structure illustrated in FIGS. 1 to 9 is an example skeleton structure in an engine compartment that is located in the front of the vehicle. Typically, front side members serving as principal skeleton components extend in the engine compartment on both sides of the vehicle across the front-and-rear direction, and the vehicle front structure illustrated in FIGS. 1 to 9 is disposed below the front side members. For simplified illustration, FIGS. 1 to 9 only illustrate the skeleton structure that is located below the front side members, and do not illustrate the front side members.

The vehicle front structure according to the illustrated embodiment includes an Fr suspension member 10, an Fr bumper R/F 12, extensions 14 (extension components), lower side members 16 (connection components), and reinforcement components 18.

The Fr suspension member 10 is a frame component (skeleton component) having a generally rectangular shape, and supports a suspension mechanism (not illustrated) that suspends front wheels 21 from the body of the vehicle. The Fr suspension member 10 includes side rails 10A, a front cross 10B, and a rear cross 10C.

The side rails 10A and 10A are two side components of the Fr suspension member 10 and extend generally in the front-and-rear direction of the vehicle in a manner such that they are spaced apart from each other in the width direction. The front cross 10B is a front end component of the Fr suspension member 10 and extends in the vehicle width direction in a manner such that it connects front ends of the side rails 10A and 10A. The rear cross 10C is a rear end component of the Fr suspension member 10 and extends in the vehicle width direction in a manner such that it connects rear ends of the side rails 10A and 10A. These components each have, for example, a closed section structure that is forming by stacking an upper member and a lower member together. These components are composed, at least in part, of a metallic material such as aluminum.

The Fr suspension member 10 has the extensions 14 (extension components) at its front end portions that are located at ends as viewed in the width direction. The extensions 14 project from outer ends 10D of the front end of the Fr suspension member 10 as viewed in the width direction (see FIG. 2) further outward as viewed in the width direction. The extensions 14 are composed of a steel sheet material such as hot dip zinc-coated steel sheet.

Figure 3:
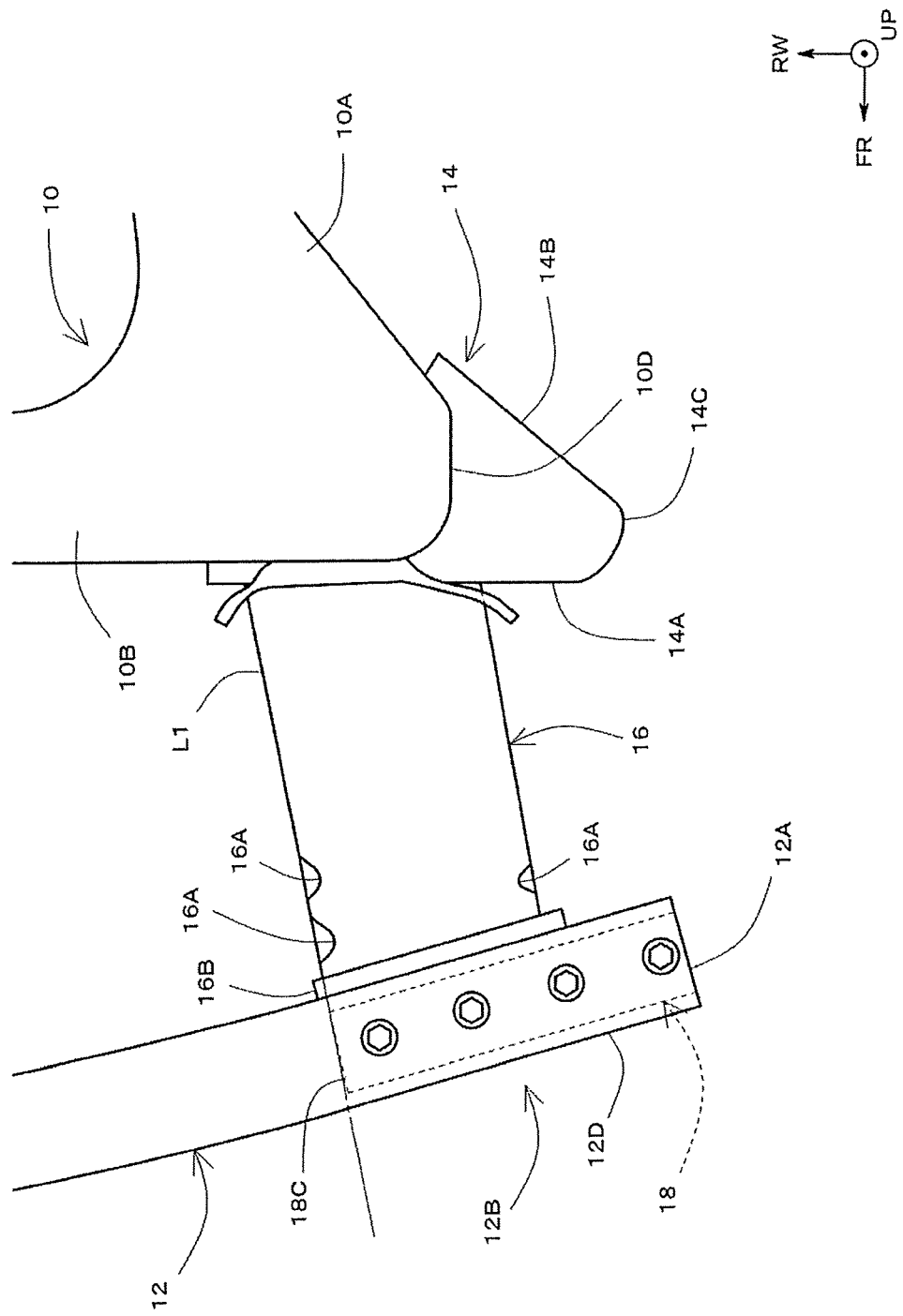
FIG. 3 is an enlarged top view of a front side end portion of the vehicle front structure according to the embodiment of the present disclosure.

The extensions 14 are disposed on the Fr suspension member 10 as illustrated in, for example, FIG. 3, so as to each cover from a front end to a side end of the Fr suspension member 10. Each of the extensions 14 includes a front surface portion 14A and a rear surface portion 14B. The front surface portion 14A faces the Fr bumper R/F 12 that is located in front of the front surface portion 14A. The front surface portion 14A is disposed generally parallel with the front surface of the front cross 10B of the Fr suspension member 10. For example, the front surface portion 14A is disposed to be in parallel with the vehicle width direction axis RW.

The rear surface portion 14B of each of the extensions 14 is disposed along an outer side surface of the side rail 10A of the Fr suspension member 10. The boundary between the front surface portion 14A and the rear surface portion 14B of the extension 14 has a rounded shape.

An outer end 14C of each of the extensions 14 as viewed in the width direction, which is the tip of the rounded shape, is positioned either in alignment, in the width direction, with an outer end 12A of the Fr bumper R/F 12 as viewed in the width direction, or slightly more toward the inside as viewed in the width direction than the outer end 12A of the Fr bumper R/F 12 as viewed in the width direction. In this positional relationship, when, as will be described below, an end portion 12B of the Fr bumper R/F 12 as viewed in the width direction is forced toward the back by a barrier during a small overlap crash, the extension 14 receives the end portion 12B as viewed in the width direction and suppresses it from moving further toward the back.

Figure 4:
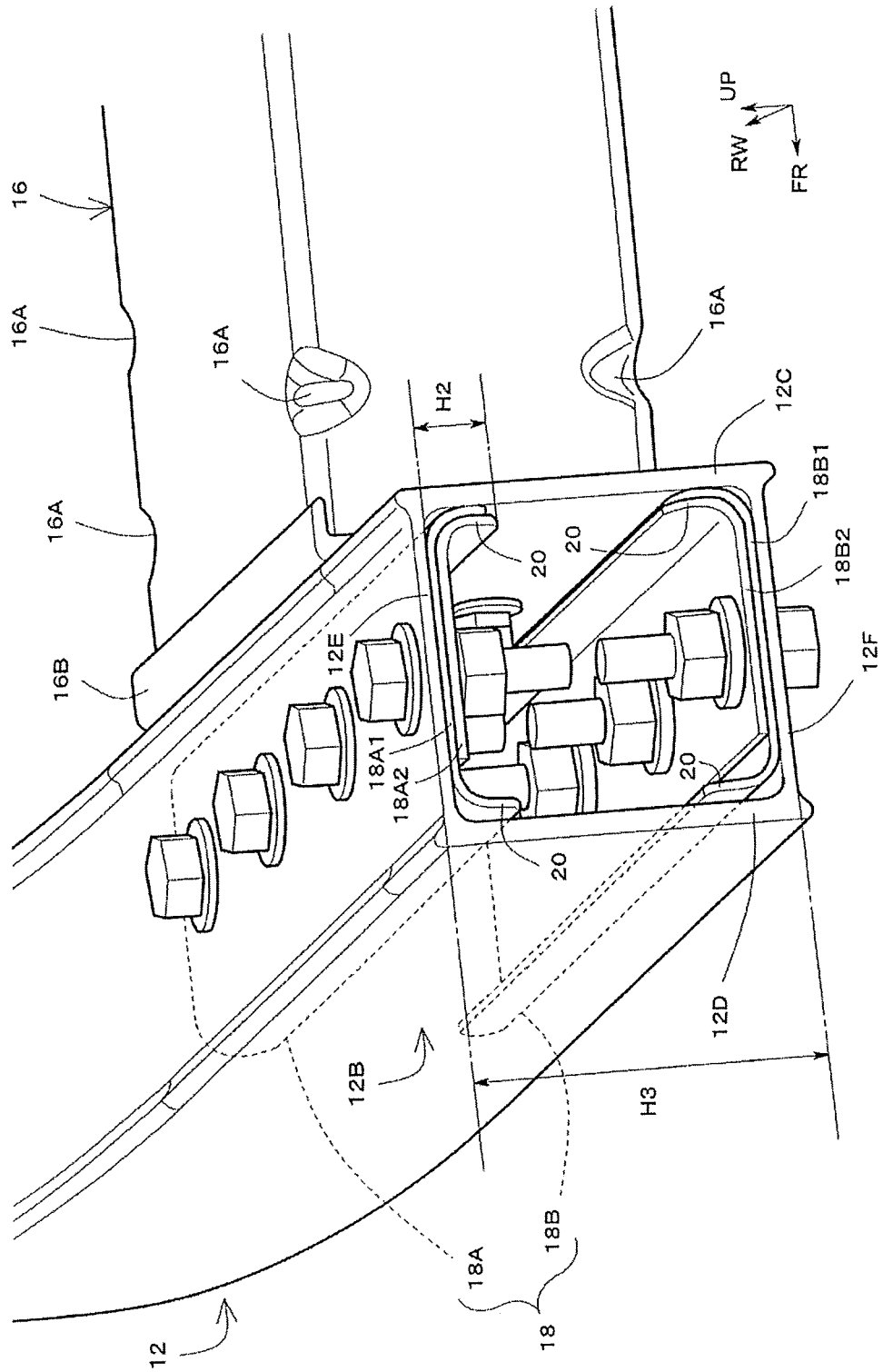
FIG. 4 is an enlarged perspective view of the front side end portion of the vehicle front structure according to the embodiment of the present disclosure.

Referring to FIG. 1, the height H1 of the extension 14 may be equal to the height H2 of an upper reinforcement component 18A (see also FIG. 4). In other words, the height H1 of the extension 14 may be less than the height H3 of the Fr bumper R/F 12. The extension 14 and the upper reinforcement component 18A are disposed in a manner such that their positions as viewed in the height direction are in alignment with each other. As such, the upper reinforcement component 18A and the extension 14 can hit against each other without fail.

Referring to FIGS. 1 and 2, the lower side members 16 extend toward the front from the front end portions of the front cross 10B of the Fr suspension member 10 that are located at outer ends as viewed in the width direction. For example, the lower side members 16 are disposed in an inclined manner such that, the closer to the front, the wider they fan out toward the outside as viewed in the width direction.

The lower side members 16 serve as connection components that connect between the Fr bumper R/F 12 and the Fr suspension member 10. As illustrated in FIG. 4, each of the lower side members 16 has a hollow, generally rectangular tubular shape and includes deformable beads 16A that are concave toward the inside in corner portions that extend in the front-and-rear direction. The deformable beads 16A are deformation starting points from which the lower side member 16 is caused to buckle and deform during a frontal crash.

The end portions 12B of the Fr bumper R/F 12 as viewed in the width direction are connected to front ends of the lower side members 16. As illustrated in, for example, FIG. 4, a front end wall 16B of the lower side member 16 and a rear surface wall 12C of the Fr bumper R/F 12 are bolted together.

Referring to FIGS. 1 and 2, the Fr bumper R/F 12 is disposed in front of the Fr suspension member 10 and extends in the width direction. The Fr bumper R/F 12 extends, for example, across the entire width of the vehicle. In particular, as illustrated in FIG. 3, the outer end 12A of the Fr bumper R/F 12 as viewed in the width direction projects more outward as viewed in the width direction than the outer end 10D of the front end of the Fr suspension member 10 as viewed in the width direction.

The Fr bumper R/F 12 is disposed at the front end of the vehicle. To meet vehicle aerodynamic characteristics or design requirements, the Fr bumper R/F 12 has an arc shape as viewed in a top view such that the center as viewed in the width direction projects the most toward the front and, the closer to the outside as viewed in the width direction, the further toward the back of the vehicle it is curved. As such, a front surface wall 12D of the bumper R/F 12, which is a crash surface against the barrier when a small overlap crash occurs, is inclined toward the back with respect to the width direction axis RW and has a shape that causes a small lateral force F2 to act upon the vehicle, as will be described below.

The Fr bumper R/F 12 has a generally rectangular tubular shape whose inside is hollow, and is formed by, for example, aluminum extrusion molding. During a frontal crash, the crash load is absorbed by crushing and deforming the Fr bumper R/F 12.

In this structure, the end portions 12B of the Fr bumper R/F 12 as viewed in the width direction, including the outer ends 12A of the Fr bumper R/F 12 as viewed in the width direction, have the reinforcement components 18. For example, the reinforcement components 18 are disposed inside the end portions 12B of the Fr bumper R/F 12 as viewed in the width direction. The end portions 12B of the Fr bumper R/F 12 as viewed in the width direction may be defined to represent areas of the Fr bumper R/F 12 in which the reinforcement components 18 are placed.

Referring to FIG. 4, the reinforcement component 18 may be composed of separate components and includes, for example, the upper reinforcement component 18A and a lower reinforcement component 18B. The upper reinforcement component 18A and the lower reinforcement component 18B have a higher strength (rigidity) than the Fr bumper R/F 12. For example, the upper reinforcement component 18A and the lower reinforcement component 18B are formed to be thicker than the Fr bumper R/F 12 if they are made of the same material as the Fr bumper R/F 12. Alternatively, the upper reinforcement component 18A and the lower reinforcement component 18B are made of a material having a higher strength than the Fr bumper R/F 12 if they have the same thickness as the Fr bumper R/F 12.

The upper reinforcement component 18A is bolted or otherwise joined to a top surface wall 12E in the end portion 12B of the Fr bumper R/F 12 as viewed in the width direction. Similarly, the lower reinforcement component 18B is bolted or otherwise joined to a bottom surface wall 12F in the end portion 12B of the Fr bumper R/F 12 as viewed in the width direction. This configuration suppresses crushing and deformation of the Fr bumper R/F 12 in the front-and-rear direction.

The upper reinforcement component 18A and the lower reinforcement component 18B have folds 20 that are located behind the front surface wall 12D of the Fr bumper R/F 12 and in front of the rear surface wall 12C of the Fr bumper R/F 12. However, gaps may be formed between the folds 20 of the upper reinforcement component 18A and the folds 20 of the lower reinforcement component 18B. In other words, the Fr bumper R/F 12 does not have to be reinforced by the reinforcement components 18 entirely in the height direction. In this structure, the front surface wall 12D and the rear surface wall 12C of the Fr bumper R/F 12 include non-reinforced portions that are not reinforced by the reinforcement components 18.

Figure 5:
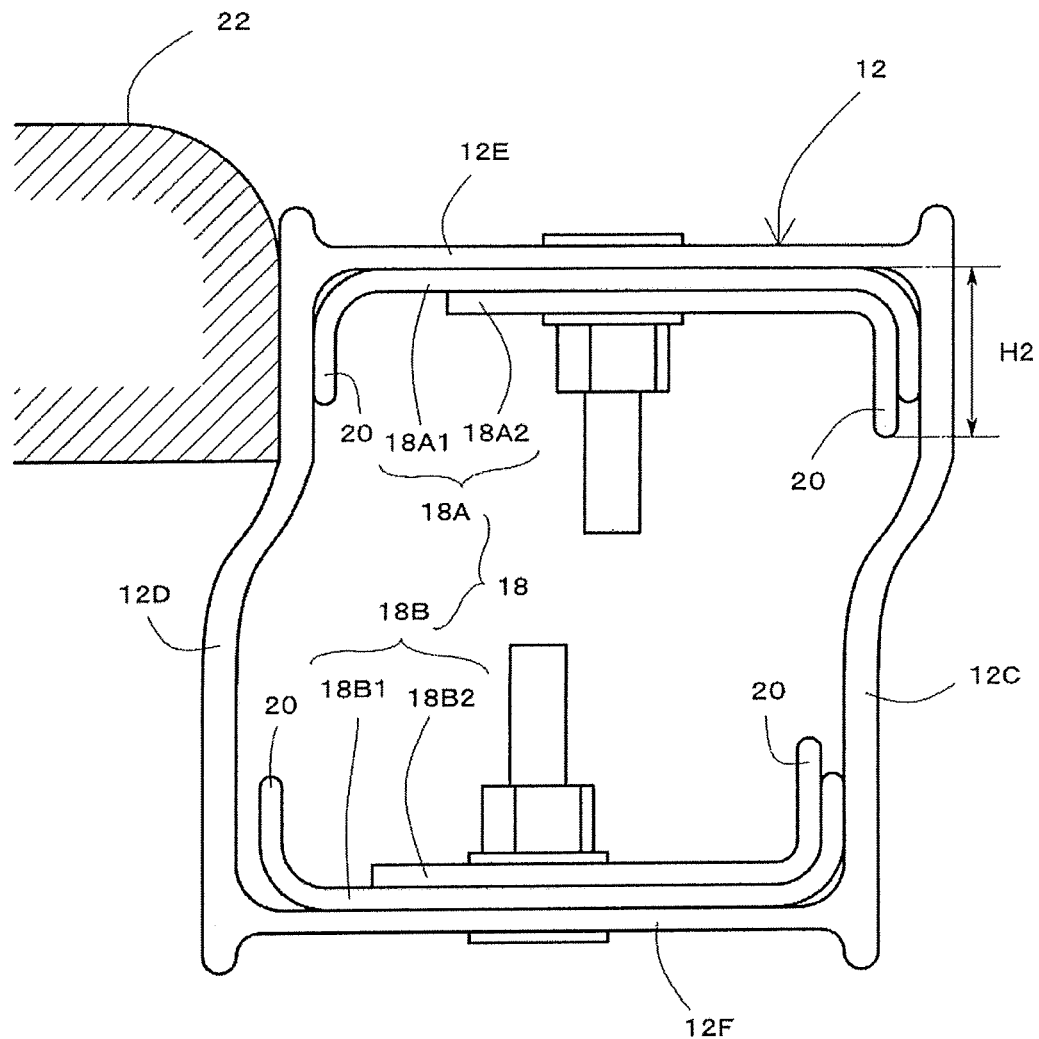
FIG. 5 is a side view that illustrates a state of an Fr bumper R/F during a frontal crash.
Figure 6:
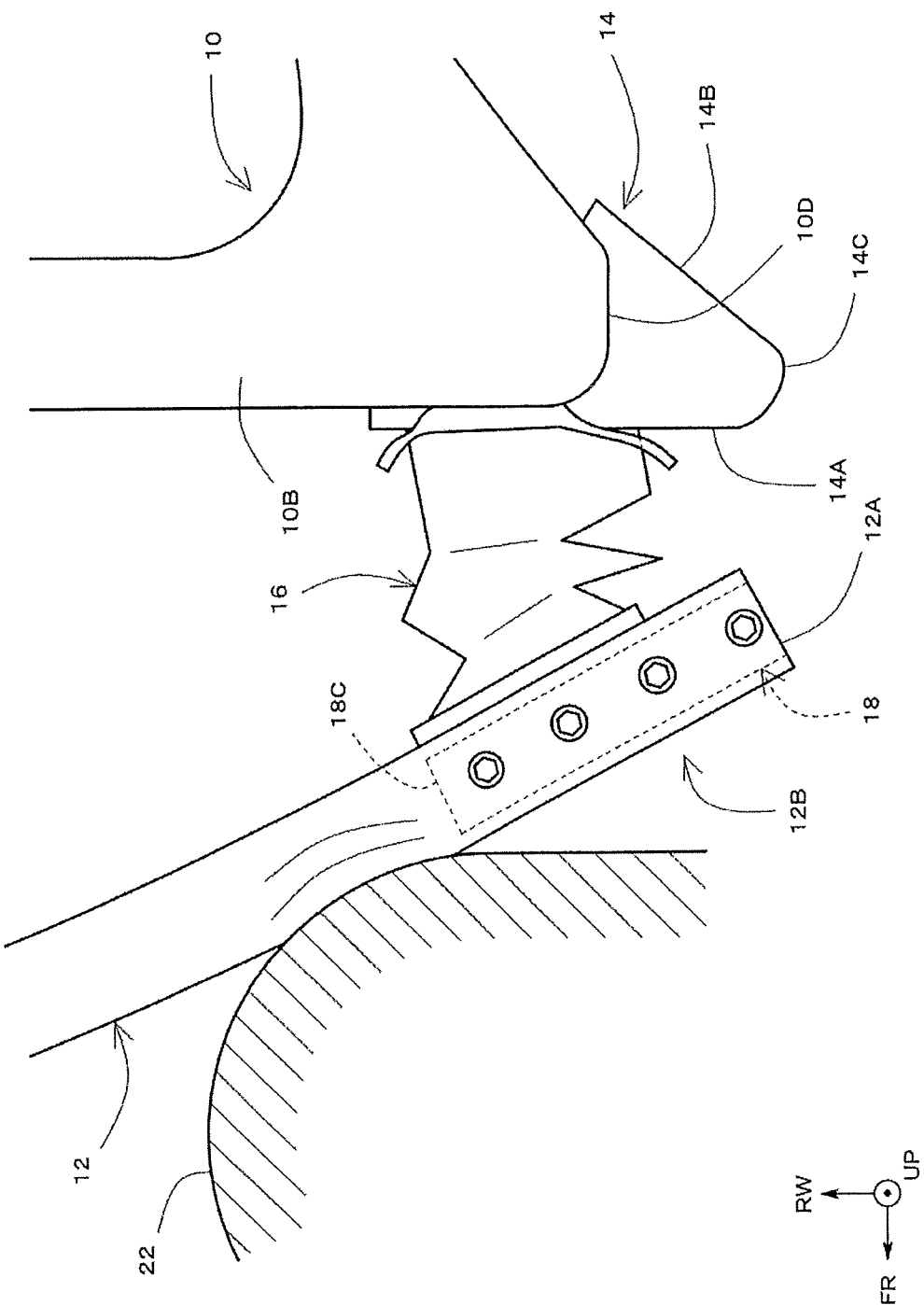
FIG. 6 is a top view that illustrates a pocket structure of the Fr bumper R/F.

Therefore, as illustrated in, for example, FIG. 5, when a barrier 22 hits against an upper half of the front surface wall 12D of the Fr bumper R/F 12, upper portions of the front surface wall 12D and the rear surface wall 12C are bent and deformed so as to be moved toward the back with respect to lower portions of the front surface wall 12D and the rear surface wall 12C. This bending deformation absorbs the crash load. The Fr bumper R/F 12 is reinforced by the upper reinforcement component 18A to suppress crushing deformation in the front-and-rear direction.

Additionally, as the upper reinforcement component 18A and the lower reinforcement component 18B are spaced apart from each other, the reinforcement strength can be adjusted. More specifically, as illustrated in FIG. 4, the upper reinforcement component 18A includes two reinforcement plates 18A1 and 18A2. Similarly, the lower reinforcement component 18B includes two reinforcement plates 18B1 and 18B2. To increase the reinforcement strength for the Fr bumper R/F 12, a greater number of reinforcement plates may be stacked, and to allow such a configuration, the upper reinforcement component 18A and the lower reinforcement component 18B are spaced apart from each other so as to provide layout flexibility.

Referring to FIG. 3, the reinforcement component 18 is disposed such that an inner end 18C of the reinforcement component 18 as viewed in the width direction is located either in alignment, in the vehicle width direction, with an inner ridge line L1 of the lower side member 16 as viewed in the width direction, or more toward the outside as viewed in the vehicle width direction than the ridge line L1.

By disposing the reinforcement component 18 in this manner so as not to extend more toward the inside as viewed in the width direction than the lower side member 16, the Fr bumper R/F 12 can be crushed and deformed when other types of crashes other than small overlap crashes (for example, full overlap crashes or offset crashes) occur.

By disposing the reinforcement component 18 in front of the lower side member 16, the crash load applied during a small overlap crash is transmitted to the Fr suspension member 10 via the lower side member 16 serving as the connection component, without crushing or deformation of the Fr bumper R/F 12 (quickly).

By disposing the reinforcement component 18 only in the end portion 12B of the Fr bumper R/F 12 as viewed in the width direction, what we can call a pocket structure is constructed taking advantage of the crushing and deformation that occur or do not occur in portions of the Fr bumper R/F 12. As illustrated in, for example, FIG. 6, it is assumed that an area hit by the barrier 22 is located slightly more toward the inside than the end portion 12B of the Fr bumper R/F 12 as viewed in the width direction and extends toward the outside as viewed in the width direction.

Then, while the end portion 12B of the Fr bumper R/F 12 as viewed in the width direction, in which the reinforcement component 18 is placed, is not crushed or deformed, a portion that is more toward the inside than the end portion 12B of the Fr bumper R/F 12 as viewed in the width direction is crushed and deformed. In other words, part of the barrier 22 gets substantially stuck in a portion that is more toward the inside than the end portion 12B of the Fr bumper R/F 12 as viewed in the width direction, so that what we can call a pocket structure is formed, and thereby the Fr bumper R/F 12 catches the barrier 22. By catching the barrier 22 in the pocket structure, slipping away of the vehicle from the barrier 22 is suppressed, and the crash load can be absorbed by the lower side member 16 or by the Fr suspension member 10 that is located behind the lower side member 16.

Figure 7:
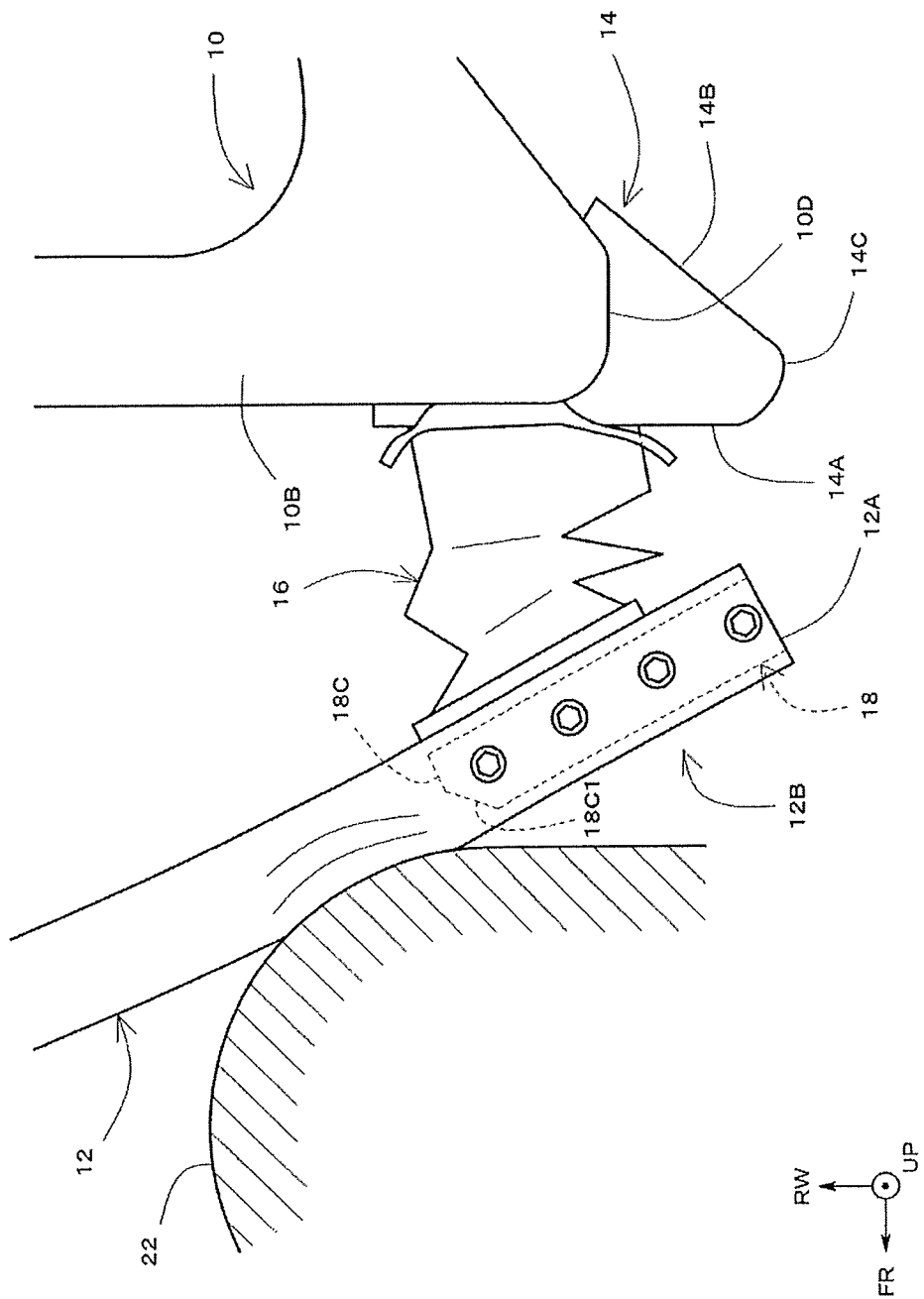
FIG. 7 is a top view that illustrates a pocket structure of the Fr bumper R/F including a reinforcement component according to another example.

During the formation of the pocket structure, stress concentration may occur at the boundary between the reinforcement component 18 and a portion that is more toward the inside, or, in other words, at the boundary between a non-crushed portion and a crushed portion, which may result in a breakage of the Fr bumper R/F 12. To address this issue, as illustrated in FIG. 7, to relieve stress concentration, a front portion of the inner end 18C of the reinforcement component 18 as viewed in the width direction may be chamfered to form an inclined portion 18C1.

Behavior During Small Overlap Crash

Figure 8:
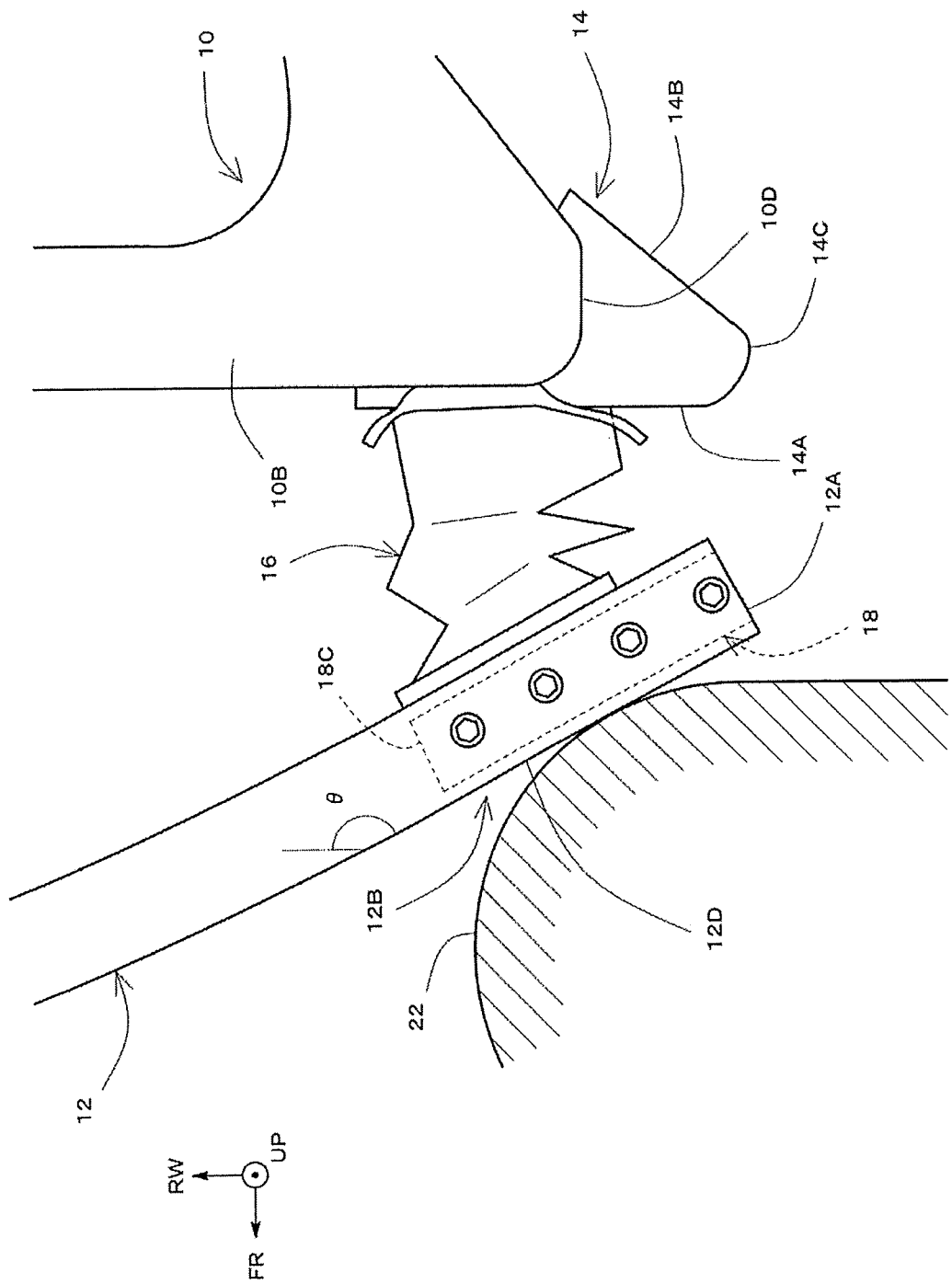
FIG. 8 is a top view that illustrates a state observed at the beginning of a small overlap crash against the vehicle front structure according to the embodiment of the present disclosure.
Figure 9:
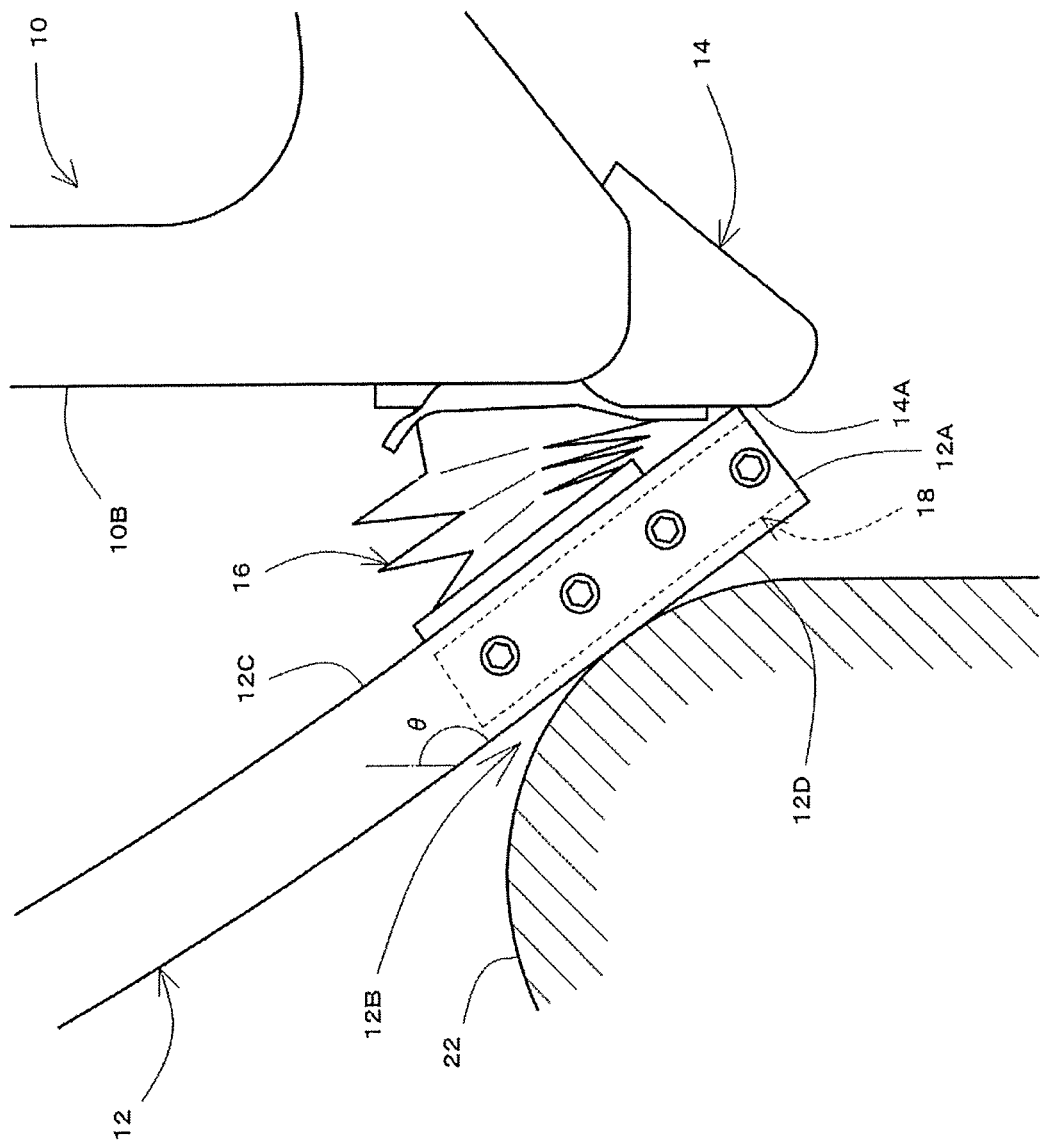
FIG. 9 is a top view that illustrates a state observed as the small overlap crash proceeds further against the vehicle front structure according to the embodiment of the present disclosure.
Figure 10:
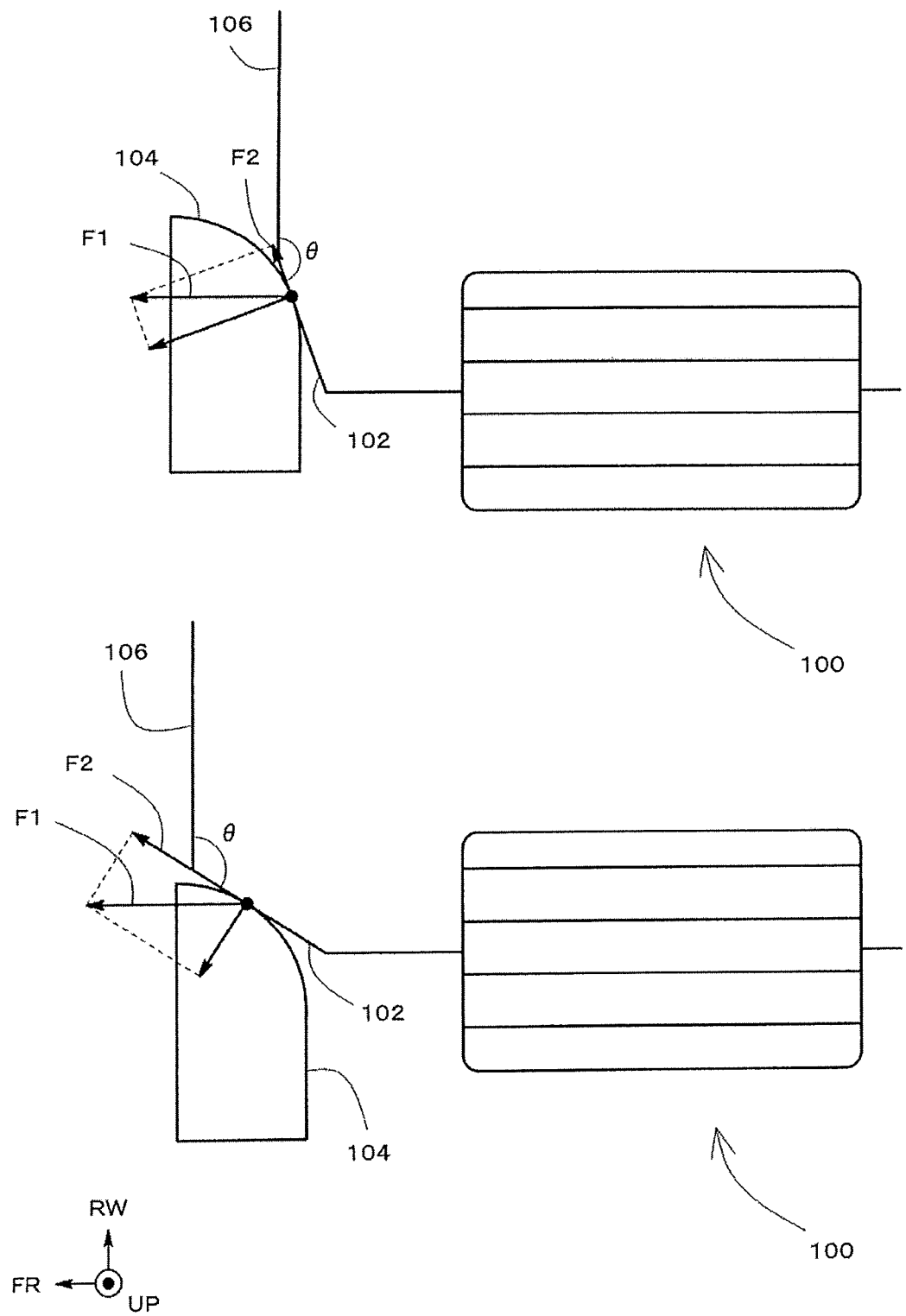
FIG. 10 illustrates a manner in which a barrier slips away when a small overlap crash occurs in a conventional structure.
Figure 11:
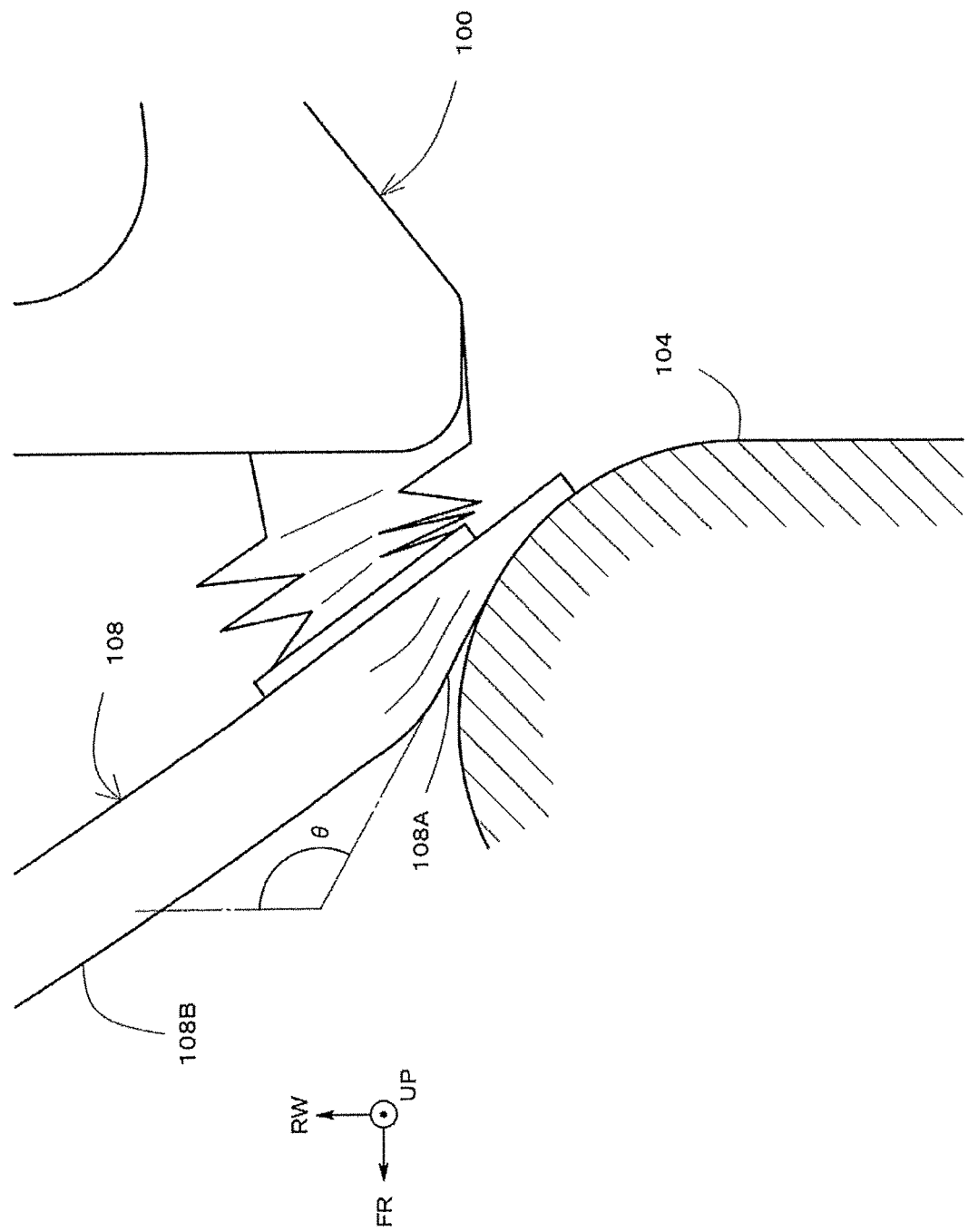
FIG. 11 is a top view that illustrates a state of a small overlap crash against a vehicle front structure according to a conventional technique.
Figure 12:
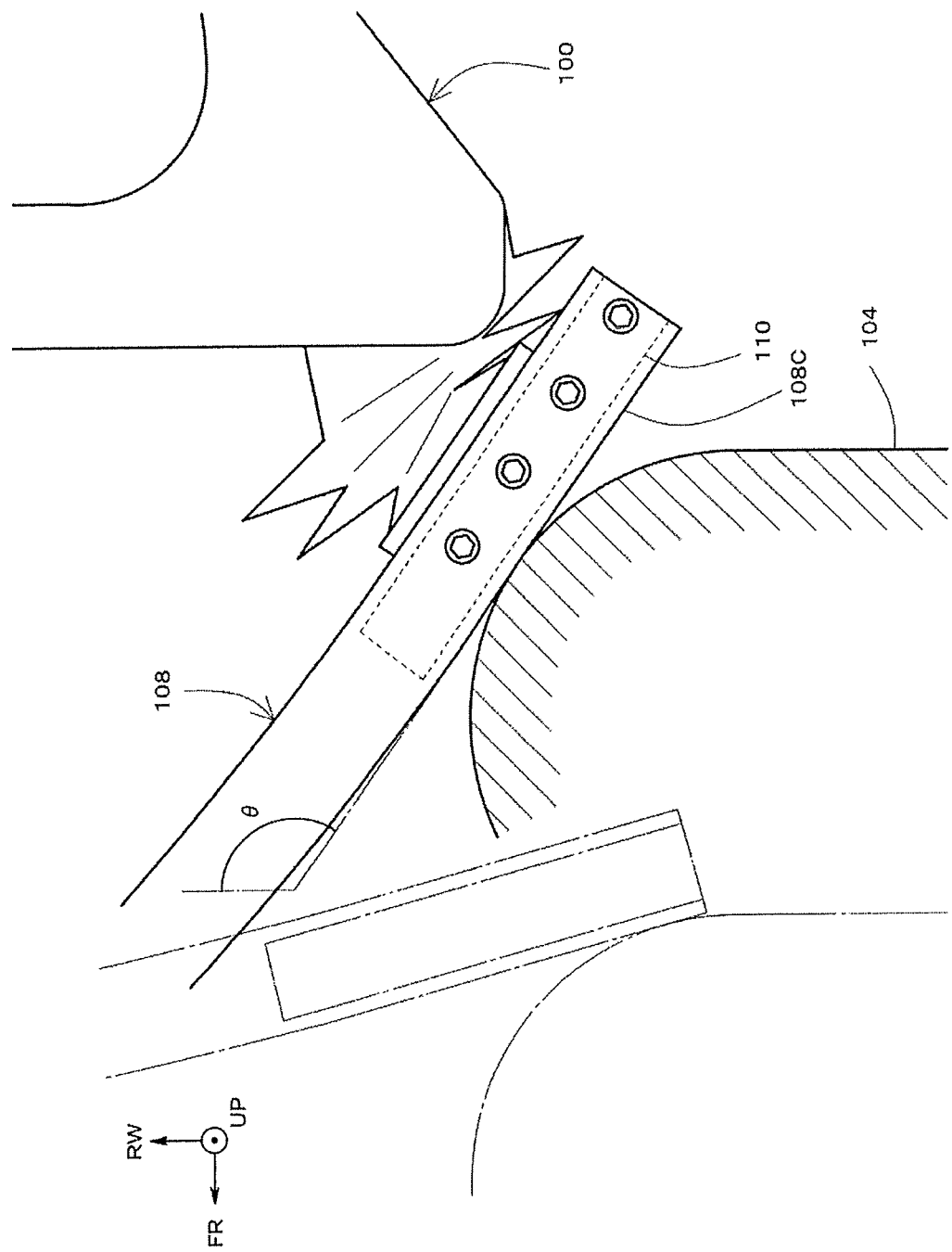
FIG. 12 is a top view that illustrates a state of a small overlap crash against a vehicle front structure according to another example conventional technique.

FIGS. 8 and 9 illustrate the behavior of the vehicle front structure according to the embodiment of the present disclosure, observed during a small overlap crash. FIG. 8 illustrates an example that is observed at the beginning of a small overlap crash, and FIG. 9 illustrates an example that is observed as the small overlap crash proceeds.

Referring to FIG. 8, at the beginning of the small overlap crash, the barrier 22 hits against the end portion 12B of the Fr bumper R/F 12 as viewed in the width direction. As described above, because the reinforcement component 18 is placed in the end portion 12B as viewed in the width direction, crushing and deformation in the front-and-rear direction are suppressed. Then, as illustrated in FIG. 8, the crash load is transmitted to the lower side member 16 via the Fr bumper R/F 12. The lower side member 16 receives the crash load and is crushed and deformed like bellows. The crash load is absorbed in this manner.

As the lower side member 16 is crushed and deformed, the end portion 12B of the Fr bumper R/F 12 as viewed in the width direction is moved toward the back. On the other hand, a central portion of the Fr bumper R/F 12 as viewed in the width direction, which is not hit by the barrier 22, substantially pulls the end portion 12B as viewed in the width direction, so that the front surface wall 12D that is the crash surface of the end portion 12B as viewed in the width direction is inclined toward the back with respect to the width direction axis RW.

As the barrier 22 goes further, the end portion 12B of the Fr bumper R/F 12 as viewed in the width direction is pushed further backward. Then, as illustrated in FIG. 9, the rear surface wall 12C of the end portion 12B as viewed in the width direction comes into contact with the front surface portion 14A of the extension 14. By receiving the end portion 12B of the Fr bumper R/F 12 as viewed in the width direction at the extension 14, the end portion 12B as viewed in the width direction is suppressed from moving further toward the back. As such, the crash surface angle θ of the front surface wall 12D that is the crash surface of the end portion 12B as viewed in the width direction is suppressed from changing from an obtuse angle toward a right angle, and the vehicle's slipping away from the barrier 22 is correspondingly delayed.

The crash load applied by the barrier 22 is transmitted to the Fr suspension member 10 via the end portion 12B of the Fr bumper R/F 12 as viewed in the width direction and the extension 14. By the action of the crash load, the Fr suspension member 10 is deformed to be bent or folded. The crash load is absorbed in this manner, and the speed of the vehicle is reduced.

It is to be understood that the present disclosure is not limited to the above-described embodiments but includes all variations and modifications without departing from the technical scope or spirit of the present disclosure as defined in the appended claims.

The invention claimed is:

1. A vehicle front structure, comprising:
a front bumper reinforcement that is disposed in front of a front suspension member and that extends in a vehicle width direction in a manner such that an outer end of the front bumper reinforcement as viewed in the vehicle width direction projects more outward than an outer end of a front end of the front suspension member;
a reinforcement component that is disposed in an end portion of the front bumper reinforcement as viewed in the vehicle width direction, the end portion including the outer end of the front bumper reinforcement; and
an extension that projects from the outer end of the front end of the front suspension member as viewed in the vehicle width direction further outward than the outer end,
wherein an inner end of the reinforcement component as viewed in the vehicle width direction, is disposed either in alignment with an inner ridge line of the lower side member, or more toward an outside as viewed in the vehicle width direction than the inner ridge line, and
wherein the front bumper reinforcement has a hollow rectangular tubular shape, the reinforcement component is disposed inside the front bumper reinforcement, the reinforcement component further comprises:
an upper reinforcement component disposed in an upper inside of the front bumper reinforcement and a lower reinforcement component disposed in a lower inside of the front bumper reinforcement so as to be spaced apart from the upper reinforcement component, and a front surface wall of the front bumper reinforcement comprises non-reinforced portions that are not reinforced by the reinforcement components.

2. The vehicle front structure according to claim 1, further comprising:
a lower side member that extends from the front end of the front suspension member toward the front of the vehicle and that is connected to the end portion of the front bumper reinforcement.

3. The vehicle front structure according to claim 1, wherein at least one of the upper reinforcement component and lower reinforcement component includes two reinforcement plates.

4. The vehicle front structure according to claim 3, wherein the two reinforcement plates are partially overlapping.

* * * * *